United States Patent
Sandstrom et al.

(10) Patent No.: US 7,122,586 B2
(45) Date of Patent: Oct. 17, 2006

(54) PREPARATION OF SILICA-RICH RUBBER COMPOSITION BY SEQUENTIAL MIXING WITH MAXIMUM MIXING TEMPERATURE LIMITATIONS

(75) Inventors: Paul Harry Sandstrom, Cuyahoga Falls, OH (US); John Eugene Varner, Barberton, OH (US); Bernard Matthew Bezilla, Jr., Stow, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 360 days.

(21) Appl. No.: 10/389,046

(22) Filed: Mar. 14, 2003

(65) Prior Publication Data

US 2004/0181004 A1 Sep. 16, 2004

(51) Int. Cl.
C08J 3/20 (2006.01)
C08K 3/24 (2006.01)
C08K 3/36 (2006.01)
C08C 19/20 (2006.01)

(52) U.S. Cl. ............ 523/344; 523/351; 524/493; 524/495; 525/332.6

(58) Field of Classification Search ............ 524/493, 524/492; 525/332.5, 332.6, 333.5; 523/344, 523/351
See application file for complete search history.

(56) References Cited

U.S. PATENT DOCUMENTS

| | | | |
|---|---|---|---|
| 5,534,574 A | 7/1996 | Sandstrom et al. | 524/262 |
| 5,534,599 A * | 7/1996 | Sandstrom et al. | 525/342 |
| 5,614,580 A | 3/1997 | Zanzig et al. | 524/492 |
| 5,711,904 A | 1/1998 | Eswaran et al. | 264/40.7 |
| 5,739,198 A | 4/1998 | Sandstrom et al. | 524/493 |
| 6,040,364 A * | 3/2000 | Mabry et al. | 523/318 |
| 6,117,927 A * | 9/2000 | Toba et al. | 524/261 |
| 6,269,858 B1 * | 8/2001 | Sandstrom | 152/547 |
| 6,306,949 B1 | 10/2001 | Materne et al. | 524/495 |
| 6,579,930 B1 * | 6/2003 | Herberger et al. | 524/492 |
| 6,818,693 B1 * | 11/2004 | Heinrich et al. | 524/445 |

FOREIGN PATENT DOCUMENTS

| | | |
|---|---|---|
| EP | 845493 | 6/1998 |
| EP | 989161 | 3/2000 |
| EP | 992535 | 4/2000 |
| EP | 994150 | 4/2000 |
| EP | 1002835 | 5/2000 |
| EP | 1130053 | 9/2001 |
| EP | 1228899 | 8/2002 |

OTHER PUBLICATIONS

European Search Report.

* cited by examiner

Primary Examiner—Tae H. Yoon
(74) Attorney, Agent, or Firm—Henry C. Young, Jr.

(57) ABSTRACT

The invention relates to preparation of silica-rich rubber compositions by a sequence of sequential mixing steps conducted in internal rubber mixer(s) with individual maximum temperature limitations. The mixing steps are comprised of at least two non-productive mixing steps followed by a productive mixing step. The non-productive mixing steps themselves are comprised of at least one preliminary non-productive mixing step followed by a final non-productive mixing step. Elastomer, silica and coupling agent are added in at least one of said preliminary non-productive mixing steps to the exclusion of said final non-productive mixing step and said productive mixing step. Sulfur and sulfur vulcanization accelerator(s) are added in said productive mixing step to the exclusion of said non-productive mixing steps. The preliminary non-productive mixing step(s) are individually conducted to a maximum mixing temperature in a range of from about 150° C. to about 180° followed by the final non-productive mixing step to a reduced maximum mixing temperature in a range of from about 90° C. to about 130° C. The maximum mixing temperature of said final non-productive mixing step is at least 20° C. lower than the maximum temperature for said preliminary non-productive mixing stage(s). The productive mixing step is conducted to a maximum temperature in a range of from about 90° C. to about 120° C. The rubber composition is removed from its respective internal rubber mixer and cooled to below 40° C. between said mixing steps. The invention is further intended to relate to a rubber composition prepared by such mixing process and to a tire having at least one component comprised of such rubber composition.

14 Claims, No Drawings

PREPARATION OF SILICA-RICH RUBBER COMPOSITION BY SEQUENTIAL MIXING WITH MAXIMUM MIXING TEMPERATURE LIMITATIONS

FIELD OF THE INVENTION

The invention relates to preparation of silica-rich rubber compositions by a sequence of sequential mixing steps conducted in internal rubber mixer(s) with individual maximum temperature limitations. The mixing steps are comprised of at least two non-productive mixing steps followed by a productive mixing step. The non-productive mixing steps themselves are comprised of at least one preliminary non-productive mixing step followed by a final non-productive mixing step. Elastomer, silica and coupling agent are added in at least one of said preliminary non-productive mixing steps to the exclusion of said final non-productive mixing step and said productive mixing step. Sulfur and sulfur vulcanization accelerator(s) are added in said productive mixing step to the exclusion of said non-productive mixing steps. The preliminary non-productive mixing step(s) are individually conducted to a maximum mixing temperature in a range of from about 150° C. to about 180° C. followed by the final non-productive mixing step to a reduced maximum mixing temperature in a range of from about 90° C. to about 130° C. The maximum mixing temperature of said final non-productive mixing step is at least 20° C. lower than the maximum temperature for said preliminary non-productive mixing stage(s). The productive mixing step is conducted to a maximum temperature in a range of from about 90° C. to about 120° C. The rubber composition is removed from its respective internal rubber mixer and cooled to below 40° C. between said mixing steps. The invention is further intended to relate to a rubber composition prepared by such mixing process and to a tire having at least one component comprised of such rubber composition.

BACKGROUND OF THE INVENTION

Tires are typically prepared of treads of elastomer based rubber compositions which may contain particulate synthetic amorphous silica reinforcement.

Coupling agents are often used with the silica to assist in its reinforcement of elastomers. Such coupling agents typically contain a moiety (e.g. alkoxysilane based moiety) which is reactive with hydroxyl groups (e.g. silanol groups) contained on the surface of the silica and another, different, moiety (e.g. polysulfide based moiety) which is interactive with diene-based elastomers. Utilization of such silica coupling agents for such purpose is well known to those skilled in such art.

In practice, the rubber compositions are prepared by a sequential series of individual mixing steps. Where an internal rubber mixer is used, such mixing steps are conventionally composed of at least one non-productive mixing step in which the elastomer(s) and compounding ingredients are mixed to the exclusion of sulfur and sulfur vulcanizing accelerator followed by a productive mixing step in an internal rubber mixer in which the sulfur and vulcanization accelerators are mixed.

Conventionally, the materials are mixed in the non-productive mixing steps to a maximum mixing temperature in a range of, for example, from about 150° C. to about 180° C.

Conventionally, the materials, including the sulfur and vulcanization accelerators, are mixed in the productive mixing step at a maximum temperature, for example, in a range of about 90° C. to about 120° C. Between mixing steps, the mixture is conventionally dumped from the internal rubber mixer, perhaps then sheeted out into rubber sheets from a roll mill, and allowed to cool to 40° C. or lower prior to introducing the mixture to the next internal rubber mixing step.

For the practice of this invention, it has been observed that a significant benefit may be obtained in a nature of reduction in the viscosity of the rubber composition at the conclusion of the final non-productive mixing step as compared to the conclusion of the preliminary non-productive mixing step(s). Such reduction in Mooney viscosity was observed to be obtained in which, for preliminary non-productive mixing steps, the materials are mixed to a maximum mixing temperature in a range of about 150° C. to about 180° C. followed by a final non-productive mixing step to a reduced, or stepped down, maximum temperature in a range of about 90° C. to about 130° C. For the final non-productive mixing step in the internal rubber mixer, the rubber composition is simply re-mixed without any appreciable addition of ingredients. Sometimes such mixing without addition of other compounding ingredients is referred to as a "re-mill" mixing step even though the mixing itself is conducted in an internal rubber mixer. Such beneficial reduction in rubber composition mixing viscosity is considered herein to be significant in order to meet a Mooney viscosity target of the rubber mixture exiting the final productive mixing step in which the overall rubber mixing time in the internal rubber mixer mixing steps can be reduced. The target Mooney viscosity of the final rubber mixture is important for the subsequent processing of the compounded rubber mixture in various rubber processing equipment such as, for example rubber extruders for producing shaped unvulcanized rubber components for a tire such as, for example, treads and apexes as well as calendered cord reinforced plies. It is to be appreciated that a specific target Mooney viscosity will vary depending upon the rubber processing equipment being used and the rubber component being produced. Such desired Mooney viscosity phenomena for the processing of a compounded rubber composition is well known to those having skill in such art.

The term "non-productive" mixing, as hereinbefore discussed, is conventionally used to relate to one or more sequential mixing steps for mixing one or more diene-based elastomers with one or more ingredients without addition of free sulfur and sulfur vulcanization accelerator(s). The term "productive" mixing, as hereinbefore discussed, is conventionally used to relate to a mixing step following said non-productive mixing step(s) in which free sulfur and one or more vulcanization accelerator(s) are mixed with the rubber composition from the non-productive mixing step(s). Such sequential non-productive and productive mixing steps are well known to those having skill in such art. The term "carbon black" is used herein to refer to rubber reinforcing carbon blacks and such type of carbon black is well known to those having skill in such art. The term "silica-rich" refers herein to a rubber composition in which, insofar as its carbon black and silica reinforcement, particularly precipitated silica, fillers are concerned, the silica is in the majority of such fillers.

In the description of this invention, the term "phr" where used herein, and according to conventional practice, refers to "parts of a respective material per 100 parts by weight of rubber, or elastomer".

In the description of this invention, the terms "rubber" and "elastomer" where used herein, are to be used interchangeably, unless otherwise prescribed. The terms "rubber composition", "compounded rubber" and "rubber compound", if used herein, are used interchangeably to refer to "rubber which has been blended or mixed with various ingredients and materials" and such terms are well known to those having skill in the rubber mixing or rubber compounding art. The terms "vulcanize" and "cure" where used therein are used interchangeably unless otherwise indicated.

SUMMARY AND PRACTICE OF THE INVENTION

In accordance with this invention, a process of preparing a silica reinforced (e.g. silica-rich) rubber composition comprises a series of sequential mixing steps conducted in at least one internal rubber mixer;

(A) wherein said mixing steps are comprised of at least two sequential non-productive mixing steps followed by a productive mixing step;

(B) wherein said non-productive mixing steps are comprised of at least one preliminary non-productive mixing step followed by a subsequent, final non-productive mixing step;

(C) wherein at least one diene-based elastomer, amorphous precipitated silica having hydroxyl groups (e.g. silanol groups) on its surface and coupling agent are added in at least one of said preliminary non-productive mixing steps to the exclusion of addition thereof in said final non-productive mixing step and said productive mixing step and wherein said coupling agent is comprised of a bis(3-trialkoxysilylalkyl) polysulfide where said polysulfide contains an average of from 2 to about 4, alternately from about 2 to 2.6 or from 3.5 to 4, connecting sulfur atoms in its polysulfidic bridge;

(D) wherein free sulfur and sulfur vulcanization accelerator(s) are added in said productive mixing step to the exclusion of such addition in said non-productive mixing steps;

(E) wherein said preliminary non-productive mixing step(s) are individually conducted to a maximum mixing temperature in a range of from about 150° C. to about 180° C.;

(F) wherein said final non-productive mixing step is conducted to maximum mixing temperature in a range of from about 90° C. to about 130° C. and at least 20° C. lower than said maximum temperature for said preliminary non-productive mixing steps(s);

(G) wherein said productive mixing step is conducted to a maximum mixing temperature in a range of from about 90° C. to about 120° C.; and (H) wherein the rubber composition is removed from its respective internal rubber mixer at the conclusion of each mixing step and cooled to a temperature below 40° C.

In practice, said rubber composition is comprised of:

(A) at least one diene-based elastomer; and (B) about 25 to about 130, alternately about 40 to about 90, phr of reinforcing filler composed of:

(1) about 20 to about 120, alternately about 20 to about 80, phr of synthetic amorphous precipitated silica aggregates which contain hydroxyl groups (e.g. silanol groups) on their surface, and (2) about 5 to about 60, alternately about 20 to about 40, phr of rubber reinforcing carbon black, provided however that greater than 50 weight percent of said reinforcing filler is said precipitated silica aggregates, and (3) a coupling agent as a bis(3-trialkoxsilylalkyl) polysulfide having an average of from 2 to about 4, alternately an average of from 2 to about 2.6 or from about 3 to about 4, connecting sulfur atoms in its polysulfidic bridge.

In practice, the period of mixing the ingredients (e.g. comprised of elastomers, carbon black, silica and coupling agent) in one or more individual preliminary non-productive mixing step(s) in an internal rubber mixer to said maximum temperature for each preliminary non-productive mixing step may be for a period ranging, for example, from about 60 to about 600, alternately about 120 to about 420 seconds.

In practice, the period of mixing the ingredients, namely the re-milling operation, in the final non-productive mixing step may be for a period ranging, for example, from about 60 to about 480, alternately about 120 to about 300 seconds.

The productive mixing step, with its addition of free sulfur and at least one sulfur vulcanization accelerator, may be conducted for a period, for example, in a range of from about 30 to about 360 seconds or 60 to about 180 seconds.

In practice, the temperature of the diene-based elastomer, silica and coupling agent, upon introduction to the respective internal rubber mixer are individually below 40° C. and desirably in a range of from about 20° C. to about 30° C. Thus, as the rubber and associated ingredients are mixed within the respective internal rubber mixer, the temperature of the rubber composition essentially autogeneously increases to the said maximum temperature primarily caused by the high shear internal mixing of the ingredients.

A significant aspect of this invention is the dividing of the non-productive mixing steps into at least one preliminary internal mixing step(s) for a conventional rubber composition comprised of diene-based elastomer, carbon black, silica and silica coupler to a relatively conventional maximum mixing temperature range followed by a final non-productive re-mill mixing (mixing of the ingredients without addition of significant additional ingredients) of the rubber composition to a significantly lower maximum mixing temperature, in which the rubber composition is allowed to cool between the respective mixing steps.

Thus a significant aspect of the invention is considered herein to be the observed enabled process of preparation of a rubber composition with a desired Mooney viscosity (the desired viscosity dependent upon the nature of desired further rubber processing after the mixing steps) with an significant mixing energy savings because the observed result is reached at a lower overall internal rubber mixing time and with a reduction of viscosity of the rubber composition upon leaving the final non-productive mixing step.

In practice, the bis(3-alkoxysilylalkyl) polysulfide silica coupler, or coupling agent, is preferably a bis(3-triethoxysilylpropyl) polysulfide. While preferably the coupling agent contains an average of only 2 to 2.6 sulfur atoms in its polysulfidic bridge, such organosilane polysulfide with an average of 3 to 4 sulfur atoms in its polysulfidic bridge or a combination of both of such organosilane polysulfides may be used. In one alternative in the practice of the invention, such organosilane polysulfide may be used which has an average of from 2 to 2.6 connecting sulfur atoms in its polysulfidic bridge to the exclusion of organosilane polysulfides which contain an average greater than 2.6 sulfur atoms in its polysulfidic bridge such as, for example exclusion of organosilane tetrasulfides commercially available as Si69, a trademark of Degussa GmbH which is understood to have an average of from about 3.5 to about 4 connecting sulfur atoms in its polysulfidic bridge. This alternative is presented because, with the more limited connecting sulfur atoms (for example, a maximum average of about 2.6 connecting sulfur atoms) as one alternative for the coupling agent desired for this invention, the bonds between the sulfur are relatively stronger and therefore have a far less tendency to form, or release, free sulfur in the rubber mixture as it is being processed at elevated temperatures as compared to similar organosilane polysulfides which contain an average of at least 3.5 connecting sulfur atoms in their polysulfidic bridges. The excess in situ generated free sulfur by the silane component of the organosilane polysulfide with an average of connecting sulfur atoms in the polysulfide bridge of higher than 2.6, and particularly higher than 3.5, is unwanted herein (the non-productive mixing step) as it may tend to prematurely interact with double bonds contained in the diene-based elastomers during the mixing process and therefore to unnecessarily, and inappropriately prematurely, increase the viscosity of the rubber composition during the mixing process and is considered herein to therefor impair an efficient mixing and creation of a good dispersion of the carbon black/silica reinforcing filler within the rubber composition.

In further accordance with this invention, a rubber composition is provided which is prepared by the process of this invention.

In additional accordance with this invention, a tire is provided having at least one component comprised of such rubber composition.

In additional accordance with this invention, a tire is provided having a tread comprised of such rubber composition.

It is to be appreciated that said diene-based elastomer for this invention may be selected from homopolymers and copolymers of dienes such as for, example, isoprene and 1,3 butadiene, and copolymers of styrene and/or alpha methyl styrene with at least one diene selected from isoprene and 1,3-butadiene.

Representative of such elastomers are, for example, styrene/butadiene copolymers whether prepared by emulsion or organic solution polymerization, cis 1,4-polybutadiene, cis 1,4-polyisoprene whether natural or synthetic as well as elastomers such for example and if desired, trans 1,4-polybutadiene, isoprene/butadiene copolymers, styrene/isoprene copolymers, medium to high vinyl polybutadiene having a vinyl content in a range of about 30 to about 90 percent and styrene/isoprene/butadiene terpolymers and their mixtures.

In practice, such elastomers may be comprised of at least one functionalized diene-based elastomer as polymers of at least one of isoprene and 1,3-butadadiene and copolymers of styrene and at least one of isoprene or alpha methylstyrene and 1,3-butadiene such as, for example, (A) functionalized diene-based elastomer which contains one or more functional groups available for reaction with or interaction with said coupling agent and/or said precipitated silica and/or carbon black reinforcing filler, wherein said functional groups are selected from at least one of terminal and/or pendant hydroxyl and carboxyl groups; and (B) functionalized diene-based elastomer which contains at least one terminal and/or pendant functional group available for reaction or interaction with said coupling agent and/or said precipitated silica and/or carbon black reinforcing filler selected from isocyanate groups, blocked isocyanate groups, epoxide groups, amine groups such as for example primary amine groups, secondary amine groups and heterocyclic amine groups, alkoxysilane groups, hydroxypropyl methacrylate (HPMA) groups, acrylate groups and anhydride groups.

Such functionalized type of elastomers are understood to be known to those having skill in such art.

The diene-based elastomer which contains reactive hydroxyl groups and/or carboxyl groups, may be prepared, for example, by organic solvent polymerization of isoprene and/or 1,3-butadiene or copolymerization of styrene or alpha methylstyrene with isoprene and/or 1,3-butadiene.

The introduction of reactive hydroxyl and/or carboxyl groups on said diene-based elastomer may be accomplished by, for example, radical grafting one or more functional groups of interest onto the polymer backbone, copolymerization of polymerizable materials which contain one or more functional groups of interest, deprotection of protected copolymerized groups, addition to a fraction of the unsaturated backbone, and for end terminated polymers, a reaction of the living polymer chain with a molecule containing the function of interest. An amine group may be introduced in a styrene/butadiene copolymer, for example, by first modifying the styrene monomer with a pyrrolidone and then copolymerizing the modified styrene with 1,3-butadiene monomer.

Exemplary of such diene-based elastomers which contain hydroxyl and/or polar functional groups and multifunctional compatibilizers are, for example hydroxyl terminated polybutadienes, hydroxyl terminated polyisoprenes, anhydride-containing polybutadiene and/or polyisoprene elastomers, using, for example anhydrides from the Sartomer Company as the Ricobond™ series of anhydrides, urethane-containing polybutadiene and/or polyisoprene, using, for example, urethane from the Sartomer Company as CN302™, diacrylate-containing polybutadiene and/or polyisoprene using, for example diacrylate from the Sartomer Company as CN303™, epoxide-containing elastomer such as, for example, epoxidized natural rubber (epoxidized cis 1,4-polyisoprene), multifunctional additive-containing polybutadiene and/or polyisoprene, using a material, for example, vinyl triethoxy silane-methyl methacrylate copolymers, bis (triethoxy) ethane and bis[3-(triethoxysilyl)propyl] ethane.

In further practice of the invention, said elastomers may be comprised of, for example, tin coupled, organic solution polymerization prepared elastomers selected from polymers of at least one of isoprene and 1,3-butadadiene monomers and copolymers of styrene and at least one of isoprene and 1,3-butadiene monomers. Such tin coupled diene-based elastomers, and particularly tin coupled copolymers of styrene and 1,3-butadiene monomers, are well known to those having skill in such art.

For example, tin coupled copolymers of styrene/butadiene may be prepared, for example, by introducing a tin coupling agent during the styrene/1,3-butadiene monomer copolymerization reaction in an organic solvent solution, usually at or near the end of the polymerization reaction. Such coupling of styrene/butadiene copolymers is well known to those having skill in such art.

In practice, it is usually preferred that at least 50 percent and more generally in a range of about 60 to about 85 percent of the Sn (tin) bonds in the tin coupled elastomers are bonded to butadiene units of the styrene/butadiene copolymer to create Sn-dienyl bonds such as butadienyl bonds.

Creation of tin-dienyl bonds can be accomplished in a number of ways such as, for example, sequential addition of 1,3-butadiene to the copolymerization system or use of modifiers to alter the styrene and/or 1,3-butadiene reactivity ratios for the copolymerization. It is believed that such techniques, whether used with a batch or a continuous copolymerization system, are well know to those having skill in such art.

Representative of such tin compounds are, for example, alkyl tin trichloride, dialkyl tin dichloride, yielding variants of a tin coupled styrene/butadiene copolymer elastomer, although a trialkyl tin monochloride might be used which would yield simply a tin-terminated copolymer.

Examples of tin-modified, or coupled, styrene/butadiene copolymer elastomers might be found, for example, in U.S. Pat. No. 5,064,901.

For the reinforcing materials, in addition to the hereinbefore referenced carbon black and silica reinforcement particularly precipitated silica reinforcement, additional minor amounts of reinforcement materials may be used such as, for example, short fibers particularly aramid fibers, exfoliated clay particles such as for example exfoliated Montmorillonite clay particles and starch particularly starch/plasticizer composites as well as carbon black having domains of silica on its surface wherein the silica domains contain hydroxyl groups (e.g. silanol groups) on their surface.

It is contemplated that an alkoxy moiety of the aforesaid coupling agent is reactive with, for example, said hydroxyl groups contained on the surface contained on the surface of said starch/plasticizer composite, with hydroxyl and/or carboxyl groups and other groups such as the amine groups, contained on said functionalized diene-based elastomer, with hydroxyl groups contained on the surface of said aggregates of precipitated silica, with hydroxyl groups contained on the surface of silica domains on the surface of said silica-treated carbon black, on the surface of said exfoliated clay.

In this manner, then, it is contemplated that a complex network of reinforcement of the rubber composition is obtained by combination of reactions in situ within the elastomer hosts.

In practice, preferably said starch of said starch/plasticizer composite is composed of amylose units and amylopectin units in a ratio of about 15/85 to about 35/65, alternatively about 20/80 to about 30/70, and has a softening point according to ASTM No. D1228 in a range of about 180° C. to about 220° C.; and the starch/plasticizer has a softening point in a range of about 110° C. to about 170° C. according to ASTM No. D1228.

The alkoxy moiety of the coupling agent reactive with the starch/plasticizer composite, diene-based elastomer which contains said functional groups and hydroxyl groups on said silica surfaces is generally considered herein as being capable of reacting with at least one or more hydroxyl groups which may be contained on their surfaces and possibly with other reactive groups thereon.

In the practice of this invention, the starch/plasticizer composite may be desired to be used, for example, as a free flowing, dry powder or in a free flowing, dry pelletized form. In practice, it is desired that the synthetic plasticizer itself is compatible with the starch, and has a softening point lower than the softening point of the starch so that it causes the softening of the blend of the plasticizer and the starch to be lower than that of the starch alone. This phenomenon of blends of compatible polymers of differing softening points having a softening point lower than the highest softening point of the individual polymer(s) in the blend is well known to those having skill in such art.

For the purposes of this invention, the plasticizer effect for the starch/plasticizer composite, (meaning a softening point of the composite being lower than the softening point of the starch), can be obtained through use of a polymeric plasticizer such as, for example, poly(ethylenevinyl alcohol) with a softening point of less than 160° C. Other plasticizers, and their mixtures, are contemplated for use in this invention, provided that they have softening points of less than the softening point of the starch, and preferably less than 160° C., which might be, for example, one or more copolymers and hydrolyzed copolymers thereof selected from ethylenevinyl acetate copolymers having a vinyl acetate molar content of from about 5 to about 90, alternatively about 20 to about 70, percent, ethylene-glycidal acrylate copolymers and ethylene-maleic anhydride copolymers. As hereinbefore stated hydrolysed forms of copolymers are also contemplated. For example, the corresponding ethylene-vinyl alcohol copolymers, and ethylene-acetate vinyl alcohol terpolymers may be contemplated so long as they have a softening point lower than that of the starch and preferably lower than 160° C.

In general, the blending of the starch and plasticizer involves what are considered or believed herein to be relatively strong chemical and/or physical interactions between the starch and the plasticizer.

In general, the starch/plasticizer composite has a desired starch to plasticizer weight ratio in a range of about 0.5/1 to about 4/1, alternatively about 1/1 to about 2/1, so long as the starch/plasticizer composition has the required softening point range, and preferably, is capable of being a free flowing, dry powder or extruded pellets, before it is mixed with the elastomer(s).

Representative examples of synthetic plasticizers are, for example, poly(ethylenevinyl alcohol), cellulose acetate and diesters of dibasic organic acids, so long as they have a softening point sufficiently below the softening point of the starch with which they are being combined so that the starch/plasticizer composite has the required softening point range. Preferably, the synthetic plasticizer is selected from at least one of poly(ethylenevinyl alcohol) and cellulose acetate and more preferably poly(ethylenevinyl alcohol).

For example, the aforesaid poly(ethylenevinyl alcohol) might be prepared by polymerizing vinyl acetate to form a poly(vinylacetate) which is then hydrolyzed (acid or base catalyzed) to form the poly(ethylenevinyl alcohol). Such reaction of vinyl acetate and hydrolyzing of the resulting product is well known those skilled in such art.

Various blends of starch and ethylenevinyl alcohol copolymers can then be prepared according to mixing procedures well known to those having skill in such art. For example, a procedure might be utilized according to a recitation in the patent publication by Bastioli, Bellotti and Del Trediu entitled A Polymer Composition Including Destructured Starch An Ethylene Copolymer, U.S. Pat. No. 5,403,374.

Other plasticizers might be prepared, for example and so long as they have the appropriate Tg and starch compatibility requirements, by reacting one or more appropriate organic dibasic acids with aliphatic or aromatic diol(s) in a reaction which might sometimes be referred to as an esterification condensation reaction. Such esterification reactions are well known to those skilled in such art.

In the practice of this invention, additional inorganic fillers for the rubber composition may be used such as, for example, one or more of kaolin clay, talc, short discrete fibers, thermoplastic powders such as polyethylene and polypropylene particles, or other reinforcing or non-reinforcing inorganic fillers.

The rubber composition itself (e.g. tread rubber) can also be provided as being a sulfur cured composition through vulcanization of the uncured rubber composition (e.g. tread)

tread as a component of a tire in a manner well known to those having skill in such art, usually by curing under conditions of elevated temperature and pressure in a suitable mold for a suitable period of time.

The curatives for sulfur curing the rubber composition are curatives conventionally used for sulfur curable elastomers which typically include an addition of free sulfur and one or more appropriate cure accelerators and sometimes also a retarder. Such curatives and use thereof for sulfur curable elastomer compositions are well known to those skilled in the art.

It is to be appreciated that the coupling agent, if in a liquid form, might be used in conjunction with a carbon black carrier, namely, pre-mixed with a carbon black prior to the addition to the rubber composition, and such carbon black is usually to be included in the amount of carbon black accounted for in the rubber composition formulation.

It is readily understood by those having skill in the art that the rubber composition would be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as oils, resins including tackifying resins, silicas, and plasticizers, fillers, pigments, fatty acid, zinc oxide, waxes, antioxidants and antiozonants, peptizing agents and reinforcing materials. Depending on the intended use of the sulfur vulcanizable and sulfur vulcanized material (rubbers), the additives mentioned above are selected and commonly used in conventional amounts.

In the preparation of the rubber composition typical amounts of tackifier resins, if used, comprise about 0.5 to about 10 phr, usually about 1 to about 5 phr. Typical amounts of processing aids comprise about 1 to about 50 phr. Such processing aids can include, for example, aromatic, napthenic, and/or paraffinic processing oils. Typical amounts of antioxidants comprise about 1 to about 5 phr. Representative antioxidants may be, for example, diphenyl-p-phenylenediamine and others such as, for example, those disclosed in *The Vanderbilt Rubber Handbook* (1978), Pages 344 through 346. Typical amounts of antiozonants comprise about 1 to 5 phr.

Typical amounts of fatty acids, where used, which can include stearic acid, palmitic acid, linoleic acid or mixtures of one or more fatty acids, can comprise about 0.5 to about 5 phr.

Often stearic acid is used in a relatively impure state and is commonly referred to in the rubber compounding practice as "stearic acid" and is so referred to in the description and practice of this invention.

Typical amounts of zinc oxide comprise about 1 to about 5 phr. Typical amounts of waxes comprise about 1 to about 5 phr. Often microcrystalline waxes are used. Typical amounts of peptizers, if used, comprise about 0.1 to about 1 phr. Typical peptizers may be, for example, pentachlorothiophenol and dibenzamidodiphenyl disulfide.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to about 4 phr, or even, in some circumstances, up to about 8 phr, with a range of from about 1 to about 2.5, sometimes from about 1 to about 2, being preferred.

Accelerators are used to control the time and/or temperature required for vulcanization and to improve the properties of the vulcanizate. In one embodiment, a single accelerator system may be used, i.e., primary accelerator. Conventionally and preferably, a primary accelerator(s) is used in total amounts ranging from about 0.5 to about 4, preferably about 0.8 to about 2, phr. In another embodiment, combinations of a primary and a secondary accelerator might be used with the secondary accelerator being used in amounts of about 0.05 to about 3 phr in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The presence and relative amounts of the above ingredients, other than synthetic amorphous silica and coupling agent are not considered to be the primary subject of this invention which is more primarily directed to the preparation of rubber composition via the aforesaid step-wise sequential mixing of the ingredients in non-productive mixing steps comprised of at least one preliminary non-productive mixing step followed by a final non-productive, remilling, mixing step and then followed by a productive mixing step, all with the aforesaid maximum temperature limitations.

The terms "non-productive" and "productive" mix stages are well known to those having skill in the rubber mixing art.

As hereinbefore discussed, the rubber composition prepared according to the process of this invention may be used, for example, as tire treads. Such tires can be built, shaped, molded and cured by various methods which are known and will be readily apparent to those having skill in such art.

The following examples are provided to further illustrate the invention. The parts and percentages are by weight unless otherwise indicated.

EXAMPLE I

Silica-rich rubber samples were prepared by blending the ingredients in a series of three sequential non-productive and one final productive mixing steps. The samples are referred to herein as Control Sample A and Sample B. The recipe was the same for each of the samples. However, the final, or third, non-productive mixing step varied significantly.

In particular, the first two, or initial, non-productive mixing steps for the preparation of Control Sample A and Sample B were conducted by mixing the ingredients (in an internal rubber mixer) to a temperature of about 177° C. (the drop temperature) for the first mixing step and to a temperature of about 170° C. for the second mixing step. The periods of time for the ingredients to reach the respective temperatures (the drop temperatures at which the batch of ingredients is dropped, or dumped, from the internal rubber mixer) by autogeneous heat generation by the high shear mixing was about 340 seconds for the first and about 134 seconds for the second non-productive mixing step.

In particular, for the third, or final, non-productive mixing step for Control Sample A, the ingredients were re-milled, in an internal rubber mixer, to the temperature of the second non-productive mixing step, namely about 170° C. which required about 150 seconds of high shear mixing.

However, for the third, or final, non-productive mixing for Sample B, the ingredients were re-milled, in an internal rubber mixer, to a significantly lower temperature of about 115° C. which required only about 60 seconds of the high shear mixing.

Thereafter, the ingredients were mixed in a final productive mixing step for Control Sample A and Sample B in which sulfur, vulcanization accelerator and antidegradant were added in an internal rubber mixer for a period of about 105 (Control Sample A) or 107 (Sample B) seconds to a temperature of about 115° C.

After each of the mixing steps, the ingredients were "dumped" from the respective internal rubber mixer upon reaching the drop temperature, sheeted out from a roll mill and allowed to cool to a temperature below 40° C.

The basic ingredients for the rubber Samples is presented in the following Table 1.

TABLE 1

Rubber Compound Composition

| | Parts |
|---|---|
| First Non-Productive Mixing Step | |
| Styrene/butadiene rubber (SBR)[1] | 89.37 |
| Polybutadiene rubber[2] | 35 |
| Silica[3] | 78 |
| Coupling agent[4] | 12 |
| Processing oil[5] | 4 |
| Antioxidant[6] | 2 |
| Zinc oxide | 2.5 |
| Fatty acid | 3 |
| Wax | 1.5 |
| Second Non-Productive Mixing Step | |
| Re-mill of ingredients from first non-productive mixing step | |
| Third Non-Productive Mixing Step | |
| Re-mill of ingredients from second non-productive mixing step | |
| Productive Mixing Step | |
| Accelerator[7] | 3.5 |
| Sulfur | 2.5 |
| Antioxidant[8] | 1 |

[1]Organic solvent solution polymerization prepared styrene/butadiene rubber (SBR) obtained from The Goodyear Tire & Rubber Company, containing about 26 percent styrene and having a glass transition temperature (Tg) of about −22° C. The amount is reported in Table 1 as 89.37 phr which was composed of 65 phr of the SBR with the remainder being rubber processing oil.
[2]High cis 1,4-polybutadiene obtained as Budene 1208 from The Goodyear Tire & Rubber Company
[3]Obtained as Zeosil ™ 165 GR from The Rhodia Company, a precipitated silica which contains hydroxyl (e.g. silanol) groups on its surface
[4]Composite of bis (3-triethoxysilylpropyl) polysulfide coupling agent having an average of about 2 to about 2.6 sulfur atoms in its polysulfidic bridge and carbon black carrier in a 50/50 weight ratio as X266S ™ from the Degussa Company
[5]Flexon ™ 641 obtained from Exxon Mobil
[6]Santoflex ™ 6PPD from Flexsys Corporation
[7]Mixture of sulfenamide and guanidine based accelerators
[8]Mixed diaryl-p-phenylenediamine antioxidant from the Goodyear Tire & Rubber Company The following Table 2 summarizes the aforesaid mixing sequences for Control Sample A and Sample B in which the substantially reduced mixing drop temperature for the final non-productive mixing step for Sample B is readily observed.

TABLE 2

| | Samples | |
|---|---|---|
| Mixing Conditions | Control Sample A | Sample B |
| First Non-Productive Mixing Step | | |
| Mix time (seconds) | 340 | 340 |
| Drop temperature (° C.) | 177 | 177 |
| Second Non-Productive Mixing Step | | |
| Mix time (seconds) | 134 | 133 |
| Drop temperature (° C.) | 170 | 170 |
| Third Non-Productive Mixing Step | | |
| Mix time (seconds) | 150 | 60 |
| Drop temperature (° C.) | 170 | 115 |
| Productive Mixing Step | | |
| Mix time (seconds) | 107 | 105 |
| Drop temperature (° C.) | 115 | 115 |
| Total Internal Rubber Mixing Time | | |
| Seconds | 731 | 638 |
| Reduction of total mixing time (%) | | 12 |

From Table 2 it can readily be seen that total mixing time (time of mixing in internal rubber mixers) was reduced by 12 percent by significantly reducing the drop temperature to 115° C. from 170° C. for the batch of ingredients in the final, or third, non-productive mixing for Sample B.

The following Table 3 illustrates the uncured G' behavior as well as cure property behavior for the samples.

TABLE 3

| | Samples | |
|---|---|---|
| | Control Sample A | Sample B |
| Total internal rubber mixer mix time (seconds) | 728 | 641 |
| RPA[1]Uncured G', 0.83 Hz, 100° C., 15% strain (kPa) | | |
| First Non-Productive Mixing Step | 401 | 395 |
| Second Non-Productive Mixing Step | 314 | 299 |
| Third Non-Productive Mixing Step | 341 | 295 |
| Productive Mixing Step | 219 | 221 |
| Mooney viscosity(100° C.) (of uncured rubber), ML(1 + 4) | 50 | 50 |
| Rheometer, 150° C. | | |
| T90 (minutes) | 12 | 12.5 |
| ATS[2]Stress-strain properties of cured rubber | | |
| Tensile strength (MPa) | 17.9 | 18.2 |
| Elongation at break (%) | 418 | 437 |
| 100% modulus (MPa) | 2 | 2.1 |
| 300% modulus (MPa) | 11.5 | 11.9 |
| 300%/100% modulus ratio | 5.6 | 5.9 |
| Hot rebound (%) | 65 | 64 |

TABLE 3-continued

| | Samples | |
|---|---|---|
| | Control Sample A | Sample B |
| RPA[1]Cured G', 11 Hz, 100° C. (MPa) | | |
| 1% strain (MPa) | 2.59 | 2.85 |
| 50% strain (MPa) | .99 | 1.01 |
| Tan delta | 0.095 | 0.104 |
| DIN abrasion[3] (2.5N, mm³ relative loss) | 115 | 115 |

[1]Data according to Rubber Process Analyzer as RPA 2000 ™ instrument by Alpha Technologies, formerly the Flexsys Company and formerly the Monsanto Company. References to an RPA-2000 instrument may be found in the following publications: H. A. Palowski, et al, Rubber World, June 1992 and January 1997, as well as Rubber & Plastics News, April 26 and May 10, 1993.
[2]Data according to Automated Testing System instrument by the Instron Corporation. Such instrument may determine ultimate tensile, ultimate elongation, modulii, etc. Data reported in the Table is generated by running the ring tensile test station which is an Instron 4201 load frame.
[3]Data according to DIN 53516 abrasion resistance test procedure using a Zwick drum abrasion unit, model 6102 with 2.5 Newtons force. DIN standards are German test standards. The DIN abrasion results are reported as relative values to a control rubber composition used by the laboratory.

It can be seen from Table 3 that the represented cured sample physical properties were the same or substantially equivalent for Control Sample A and Sample B. It can also be seen from Table 3 that the uncured G' properties of the rubber composition of Control Sample A and Sample B obtained from each of the first two non-productive mixing steps and the final productive mixing step were substantially the same.

However, the uncured G' property of Sample B obtained from the final (third) non-productive mixing step, in which a significantly reduced maximum temperature was used with an associated significantly shorter internal mixing time, was significantly lower than the G' property of the Control A sample, namely only 295 kPa instead of the increased value of 341 kPa for Control Sample A. In other words, the G' for Control Sample A continued to rise from a value of 314 kPa from its second non-productive mixing step thus indicating a significant rise in its viscosity, whereas the G' value for Sample B actually reduced to a value of 295 kPa from a value of 299 kPa from its second non-productive mixing step.

The observed net effect was to be a lower resulting uncured rubber viscosity from the final non-productive mixing step when using a significantly reduced drop temperature and a significantly shorter period of mixing.

In effect, by adjusting the final non-productive mixing step, a process was enabled of preparing the rubber composition by a sequence of non-productive and productive mixing steps in which a significantly reduced drop temperature for the final, third, non-productive mixing step was used with an accompanying reduced overall internal rubber mixing period of time which surprisingly resulted in a mixed rubber composition with similar compound viscosity properties.

This is considered herein to be significant because, in one aspect of the invention a significant savings in reduction of overall mixing time and high shear mixing energy was observed for preparing the rubber composition with similar resultant beneficial compound viscosity properties to aid in subsequent processing of the prepared rubber composition.

While certain representative embodiments and details have been shown for the purpose of illustrating the invention, it will be apparent to those skilled in this art that various changes and modifications may be made therein without departing from the spirit or scope of the invention.

What is claimed is:

1. A process of preparing a silica reinforced rubber composition comprises a series of sequential mixing steps conducted in at least one internal rubber mixer;
   (A) wherein said mixing steps are comprised of at least two sequential non-productive mixing steps followed by a productive mixing step;
   (B) wherein said non-productive mixing steps are comprised of at least one preliminary non-productive mixing step followed by a subsequent, final non-productive mixing step and wherein the maximum mixing temperature for said final non-productive mixing step is at least 20° C. lower than the maximum mixing temperature for said preliminary non-productive mixing step(s);
   (C) wherein at least one diene-based elastomer, amorphous precipitated silica having hydroxyl groups on its surface and coupling agent are added in at least one of said preliminary non-productive mixing steps to the exclusion of addition thereof in said final non-productive mixing step and said productive mixing step and wherein said coupling agent is comprised of a bis(3-trialkoxysilylalkyl) polysulfide where said polysulfide contains an average of from 2 to about 4, alternately from about 2 to 2.6 or from 3.5 to 4, connecting sulfur atoms in its polysulfidic bridge;
   (D) wherein free sulfur and sulfur vulcanization accelerator(s) are added in said productive mixing step to the exclusion of such addition in said non-productive mixing steps;
   (E) wherein said preliminary non-productive mixing step(s) are individually conducted to a maximum mixing temperature in a range of from about 150° C. to about 180° C.;
   (F) wherein said final non-productive mixing step is conducted to maximum mixing temperature in a range of from about 90° C. to about 130° C. and at least 20° C. lower than said maximum temperature for said preliminary non-productive mixing step(s);
   (G) wherein said productive mixing step is conducted to a maximum mixing temperature in a range of from about 90° C. to about 120° C.; and
   (H) wherein the rubber composition is removed from its respective internal rubber mixer at the conclusion of each mixing step and cooled to a temperature below 40° C.;
   wherein said rubber composition is comprised of:
      (1) at least one diene-based elastomer; and
      (2) reinforcing filler consisting of rubber reinforcing carbon black and said synthetic amorphous precipitated silica aggregates, and, optionally, additional reinforcement material selected from the group consisting of at least one of short fibers and exfoliated clay particles, and
      (3) said coupling agent.

2. The process of claim 1 wherein said rubber composition is comprised of:
   (A) at least one diene-based elastomer; and
   (B) about 25 to about 130 phr of reinforcing filler composed of:
      (1) about 20 to about 120 phr of synthetic amorphous precipitated silica aggregates which contain hydroxyl groups on their surface, and
      (2) about 5 to about 60 phr of rubber reinforcing carbon black, and (3) a coupling agent as a bis(3-trialkoxsilylalkyl) polysulfide having an average of from 2 to about 4, alternately an average of from 2 to about 2.6 or from about 3 to about 4, connecting sulfur atoms in its polysulfidic bridge.

3. The process of claim 1 wherein the period of mixing the ingredients comprised of elastomers, carbon black, silica and coupling agent in one or more individual preliminary non-productive mixing step(s) in an internal rubber mixer to said maximum temperature for each preliminary non-productive mixing step is for a period ranging from about 60 to about 600 seconds; wherein the period of mixing the resultant rubber mixture in the final non-productive mixing step is for a period ranging from about 60 to about 480 seconds; and wherein the productive mixing step is conduced for a period in a range of from about 30 to about 360 seconds.

4. The process of claim 1 wherein said maximum mixing temperatures are reached autogeneously by high shear mixing of the rubber and associated ingredients with in the respective internal rubber mixer in which, upon reaching the associated maximum temperature, the mixture is dropped from the respective internal rubber mixer and cooled to a temperature below 40° C. before addition to the subsequent sequential mixing step and where said coupling agent is a bis(3-triethoxysilylpropyl) polysulfide.

5. The process of claim 1 wherein said precipitated silica and coupling agent are added in at least one preliminary non-productive mixing step as a pre-formed composite thereof.

6. The process of claim 1 wherein said coupling agent is a bis(3-triethoxysilylpropyl) polysulfide having an average of from 2 to about 2.6 connecting sulfur atoms in its polysulfidic bridge, to the exclusion of a bis(3-alkoxysilylalkyl) polysulfide having an average of greater than 2.6 connecting sulfur atom in its polylsulfidic bridge.

7. The process of claim 1 wherein said coupling agent is a combination of bis(3-triethoxysilylpropyl) polysulfide having an average of 2 to 2.6 connecting sulfur atoms in its polysulfidic bridge and a bis(3-triethoxysilylpropyl) polysulfide having an average of 3 to 4 connecting sulfur atoms in its polysulfidic bridge.

8. The process of claim 1 wherein said diene-based elastomers are selected from at least one of polymers of isoprene and/or 1,3-butadiene and copolymers of styrene or alpha methylstyrene and isoprene and/or 1,3-butadiene and their mixtures.

9. The process of claim 1 wherein said diene-based elastomers are selected from emulsion polymerization prepared styrene/butadiene copolymers, organic solution polymerization prepared styrene/butadiene copolymers, cis 1,4-polybutadiene, natural cis 1,4-polyisoprene, synthetic cis 1,4-polyisoprene, trans 1,4-polybutadiene, isoprene/butadiene copolymers, styrene/isoprene copolymers, vinyl polybutadiene having a vinyl content in a range of about 30 to about 90 percent and styrene/isoprene/butadiene terpolymers and their mixtures.

10. The process of claim 1 wherein said diene-based elastomers are comprised of at least one functionalized diene-based elastomer as polymers of at least one of isoprene and 1,3-butadadiene and copolymers of styrene and at least one of isoprene or alpha methylstyrene and 1,3-butadiene as, (A) functionalized diene-based elastomer which contains one or more functional groups available for reaction with or interaction with said coupling agent and/or said precipitated silica and/or carbon black reinforcing filler, wherein said functional groups are selected from at least one of terminal and/or pendant hydroxyl and carboxyl groups, and (B) functionalized diene-based elastomer which contains at least one terminal and/or pendant functional group available for reaction with said coupling agent selected from isocyanate groups, blocked isocyanate groups, epoxide groups, amine groups such as for example primary amine groups, secondary amine groups and heterocyclic amine groups, alkoxysilane groups, hydroxypropyl methacrylate (HPMA) groups, acrylate groups and anhydride groups.

11. The process of claim 1 wherein said diene-based elastomers are comprised of at least one tin coupled, organic solution polymerization prepared elastomer selected from polymers of at least one of isoprene and 1,3-butadadiene monomers and copolymers of styrene and at least one of isoprene and 1,3-butadiene monomers.

12. The process of claim 1 wherein said rubber composition contains said additional amounts of reinforcement materials selected from the group consisting of short fibers and exfoliated clay particles.

13. The process of claim 12 wherein said additional reinforcement is short aramid fibers.

14. The process of claim 12 wherein said additional reinforcement is exfoliated Montmorillonite clay particles.

* * * * *